United States Patent [19]

Manassen et al.

[11] Patent Number: 5,011,749

[45] Date of Patent: Apr. 30, 1991

[54] THIN RIBBONLIKE FLEXIBLE RECHARGEABLE ZINC/HALIDE CELL

[75] Inventors: Joost Manassen, Rehovot, Israel; Israel Cabasso, Syracuse, N.Y.

[73] Assignee: Yeda Research and Development Co., Ltd., Rehovot, Israel

[21] Appl. No.: 377,443

[22] Filed: Jul. 10, 1989

[51] Int. Cl.$^5$ ............................................. H01M 10/36
[52] U.S. Cl. ................................... 429/101; 429/199; 429/192
[58] Field of Search ......................... 429/101, 199, 192

[56] References Cited

U.S. PATENT DOCUMENTS

| | | |
|---|---|---|
| 3,285,781 | 12/1966 | Zito . |
| 3,642,538 | 2/1972 | Sito ....................................... 429/101 |
| 4,029,854 | 6/1977 | Walsh et al. .......................... 429/101 |
| 4,129,689 | 12/1978 | Henson ................................. 429/101 |
| 4,714,665 | 12/1987 | Siegel et al. .......................... 429/192 |
| 4,728,588 | 3/1988 | Noding et al. ....................... 429/127 |

FOREIGN PATENT DOCUMENTS 0148228 11/1979 Japan ................................... 429/101

*Primary Examiner*—Donald L. Walton
*Attorney, Agent, or Firm*—Browdy and Neimark

[57] ABSTRACT

A rechargeable zinc halide electrochemical cell comprises a laminate of the sequence:

a. an electrically conducting chemically inert material;
b. a matrix supporting a zinc halide; and
c. an electrically conducting layer adapted to absorb and adsorb halogen. Inert and ion specific separation layers can be added to the laminate.

Because of the laminate construction of the cell, the cell of the present invention can be made in an extremely thin configuration.

26 Claims, No Drawings

THIN RIBBONLIKE FLEXIBLE RECHARGEABLE ZINC/HALIDE CELL

FIELD OF THE INVENTION

This invention relates to rechargeable zinc/halide cells.

BACKGROUND OF THE INVENTION

This type of cell has a high theoretical energy density. These cells are, however, plagued by several serious problems, such as hydrogen evolution and dendrite formation at the zinc electrode a high rate of selfdischarge and storage of the free halogen formed during charge.

In order to counter these problems the development of these cells has almost exclusively gone in the direction of flow cells, where both anolyte and catholyte are circulated continuously and both compartments are separated by a separator or a cation exchange membrane. If the halide used is bromine, quaternary ammonium bases are dissolved in the electrolyte, which bind most of the bromine, which exists in solution in the form of polybromide ions. In the case of chlorine in most cases the chlorine formed during charging is stored as the hydrate at low temperatures and the cell has to be provided with a refrigeration system. From the above it is clear that these flow batteries are only suitable above a certain size, where it is economically feasible to provide the additional pumps, refrigeration systems and the like.

Several approaches to zinc halide cells have been described, but none of these cells has been successful.

Siegel et al., in U.S. Pat. No. 4,714,665, disclose a secondary battery comprised of three polymer films. The third film contains an electrolyte, and the first and second films contain an electrochemical species which may be in an anodic or a cathodic state, depending upon whether the battery is discharging or is being recharged. The third polymer sheet is substantially not electrically conductive under battery discharge voltages, but is electrically conductive under battery recharge voltages.

Zito, Jr., in U.S. Pat. No. 3,285,781, discloses a storage battery having specific separated compartments for each component of the cell, and a special plurality of compartments spaced relative to the positive electrode whereby bromine is distributed along that electrode for reaction, insuring intimate contact of the bromine an the positive electrode.

Noding et al., in U.S. Pat. No. 4,728,588, disclose a secondary battery composed of a polymer film and first and second collector plates. Only graphite is useful in this battery construction, as the use of carbon in other forms resulted in unsatisfactory batteries.

One of the major problems with zinc secondary cell batteries is the formation of dendrites. The dendritic growth which accompanies use of these types of batteries eventually penetrates the separator and causes short circuits. Heretofore, this problem has been dealt with by an overdesign in zinc capacity. However, this in turn reduces energy density.

SUMMARY OF THE INVENTION

The present invention describes how many of the above-mentioned problems can be solved by making the stationary cell very thin by using, instead of a liquid electrolyte, membranes in which the electrolyte is immobilized. Even in these ultrathin structures selfdischarge can be kept within reasonable limits by choosing the right construction. Most importantly, there is no dendrite formation during operation and/or recharging of the cell.

A thin rechargeable zinc/halide cell is made by constructing a sandwich-like structure, or laminate, which comprises an electrically conducting inert material, a matrix supporting a zinc halide, and an electrically conducting material which is adapted to absorb and adsorb halogen. These layers may be separated by an optional separator, which may have ion exchange properties. Such a sandwich may be prepared dry and electrolyte solution introduced afterwards by soaking, or it may be prepared wet from the beginning. A halogen adsorbing material such as activated carbon may be incorporated in the system at one side of the separator. In principle such structures can be made very thin (less than one millimeter) or thicker according to the required use. If the conducting material at the side of the halogen adsorbing material is connected with the positive pole of a current producing device and the other one with the negative pole, then when the electrolyte contains zinc halide, zinc and halogen are produced. The halogen is adsorbed and the zinc is plated out and the cell can be used as a storage battery with surprisingly good efficiency and no dendrite formation. The more detailed construction of the cell is dependent on the demands to be put on it. If a very low price is important, one electrolyte-containing membrane between the conducting foils will work without a separator or activated carbon, but selfdischarge will be high. Surprisingly, dendrite formation or hydrogen evolution is not a major problem. Dendrite formation is prevented without a reduction in energy density. By using suitable separators and halogen adsorbing materials, selfdischarge and internal resistance can be decreased appreciably and high current and voltage efficiencies and high energy densities can be obtained. Power densities can be increased appreciably by making the cells thinner. Therefore such novel cells make it possible to mass produce inexpensive rechargeable batteries of good quality and also enables those skilled in the art to manufacture cells with desired properties (e.g., high power density, high energy density, low price, etc.). The cells may be rigid or flexible depending on the materials used for their construction.

DETAILED DESCRIPTION OF THE INVENTION

A general description of the cell is delineated in the following: A piece of electrically conducting cloth, for instance made of carbon or graphite fibers, is covered with a mixture of activated carbon and electrolyte solution. Carbon blacks of high surface area like Ketjen black or Black Pearls are to be preferred. A good composition of the electrolyte is a solution of 3M zinc halide and 3M potassium chloride. On this a sheet of a hydrophilic polymer in either a crosslinked or noncrosslinked form is deposited. A suitable polymer for instance is high molecular weight polyacrylamide. On this a battery separator is laid, preferentially carrying acidic groups like Permion 1010. On this again a piece of polymer sheet is deposited and on that another piece of conducting graphite cloth. This sandwich is thoroughly wetted with electrolyte solution. The thus obtained rechargeable cell can be pressed between additional current collectors or may be enclosed in a plastic envelope with pieces of the graphite cloth protruding for making electrical contact. Such a cell of approximately two mm thickness can be charged for two hours at approximately 3 mA/cm$^2$ and will discharge for about two hours at about 80% current efficiency and about 95% voltage efficiency. Cycling may be pursued for hundreds of times without any change in the current and voltage behavior as a function of time. Energy density conforms to 120 mWh per ml. A wide choice of polymers and separators can be used and the choice will be according to considerations of price and performance. The greater part of the halogen formed is retained in the activated carbon layer. The activated carbon can be mixed with anion exchange material. The remainder of the cell is only in contact with a very small quantity of halogen and corrosion problems here are much smaller than those encountered in flowcells.

EXAMPLE 1

Two current collectors were prepared by hotpressing a mixture of 60% PVC and 40% graphite powder. Onto each of these current collectors was glued a PVC ring of 1 mm thickness defining an internal area of 10 cm$^2$. In the area of one of the rings was placed first a piece of carbon cloth of the same area. This was covered neatly with a paste prepared from 200 mg of Ketjen black and a 3M ZnBR$_2$/3M KCl solution. A 5% solution of polyacrylamide was airdried in such a way that a dry polyacrylamide foil of 10 mg per cm$^2$ was obtained. A piece of this foil of the same size as the area in the ring was deposited onto the carbon paste and was subsequently covered with a piece of Permion 1010 battery separator. In the area of the second ring also a piece of carbon cloth was placed, and this was covered with a piece of the polyacrylamide foil. The contents of both rings were wetted with electrolyte solution so that each contains 1 ml of solution. When the solution was absorbed, one ring was placed on top of the other and the current collectors are clamped together. The cell thus obtained was charged for two hours at 30 mA and discharged for the same time at the same current for many cycles. Current efficiency was 85% and voltage efficiency was 95%. This conforms to an energy density of 41 mWh per ml.

EXAMPLE 2

A cell was prepared in a manner similar to that of Example 1. The difference being that instead of 200 mg, 400 mg of Ketjen black was used and that the separator is sulfonated polyethylene. This cell was filled twice with one ml of a 1.5M ZnCl$_2$/4.5M KCl solution. It was charged at 15 mA for two hours and discharged at 10 mA for two hours. Instead of the charging voltage observed in Example 1 of 1.8 V, a charging voltage of 2.15 V was observed as expected for a zinc/chlorine cell. During the operation of hundreds of cycles of the voltage and current behavior as a function of time barely change. Observed current efficiency was 67% and voltage efficiency was 85%. The cell thus displayed constant behavior over a large number of cycles and corrosion problems have not been encountered.

EXAMPLE 3

A 2% solution of polyacrylamide was prepared in a 3M ZnBr$_2$/3M KCl solution and dried in a petri dish. A polyphenylene oxide polymer was brominated and the bromine exchanged for trimethylammonium groups. This polymer, containing anion exchange groups, was mixed with activated carbon in an organic solution and evaporated to dryness, giving a black membrane, which was equilibrated with the electrolyte solution. This membrane was deposited onto a current collector and covered with a piece of the above-mentioned polyacrylamide. It was covered with another current collector and held under slight pressure. This cell under charge/discharge of 2 mA/cm$^2$ gave 50% current efficiency and wa cycled 250 times without change in behavior. This example shows that long cycle times do not deteriorate these cells and that battery separators are not strictly necessary.

EXAMPLE 4

A 5% polyacrylic acid solution in water was prepared. A piece of paper was impregnated with the solution and allowed to dry. A cell was prepared according to example 1, but instead of the commercial battery separator the above polyacrylic acid impregnated paper was used. This cell on two hour cycles of 2 mA/cm$^2$ gave a current efficiency of 75% and a voltage efficiency of 95% and demonstrated again a good cycling life. This example shows that instead of expensive battery separators or ion exchange membranes, much cheaper separators can be used.

EXAMPLE 5

A piece of graphite cloth of 1 cm$^2$ area was covered with an activated carbon/electrolyte paste and covered with a 1 cm$^2$ piece of polyvinylalcohol hydrogel sheet of 100 micron thickness. This was covered with a piece of Permion 6001 battery separator, which again was covered with a polyvinyl alcohol sheet and the same kind of battery separator. This was covered with a polyvinylalcohol sheet and this finally with a 1 cm$^2$ piece of graphite cloth. Within a glass tube of 1 cm$^2$ bore this composition was slightly pressed between two graphite discs. This cell on cycling at 2 mA two hour cycles gave a current efficiency of 85% and a voltage efficiency of 94%. This example shows that, depending on the construction used, very high efficiencies can be obtained and that selfdischarge can be almost entirely prevented.

EXAMPLE 6

A plastic envelope was prepared the following way: Stacked were polypropylene sheet, carbon cloth, Permion battery separator 6001, carbon cloth, polypropylene sheet. By means of an ordinary welding machine these materials were welded together in such a way that a rectangular envelope was formed, open on one side only. A piece of polyacrylamide foil of 10 mg/cm$^2$ was covered with slightly wetted Ketjen black and rapidly inserted into the envelope in such a way that the Ketjen black was in contact with one of the carbon cloth electrodes and the clean side with the separator. At the other side of the separator another piece of polyacrylamide foil was inserted. The envelope was then closed by welding at the fourth side of the rectangle in such a way that the electrode area is 10 cm$^2$. By means of a syringe one ml of electrolyte solution was injected at each side of the separator and the holes made by the syringe were closed by pressing slightly with the welder.

A. By using a 3M ZnBr$_2$/3M KCl solution and subsequent cycling at 30 mA an average charging voltage of 1.85 and discharging voltage of 1.75 volts was obtained.

B. By taking 3M $ZnCl_2$/3M KCl electrolyte, a charging voltage of 2.15 and a discharging voltage of 1.9 volts was obtained. With both electrolytes good reproducibility of cycles and energy efficiency are obtained.

EXAMPLE 7

Stripes were prepared of 8 cm width of graphite cloth and of Permion 6001 battery separator. A 5% polyacrylamide solution was airdried and the obtained sheets, which contains 10 mg of polymer per $cm^2$, were cut into strips of 5 cm width. Ketjen black was mixed with 10% polyacrylamide solution and airdried until sheets are obtained, which sheets contain 20 mg of the activated carbon and 10 mg of the polymer per $cm^2$. This black sheet was cut into strips of 5 cm width. The following composite was prepared: polypropylene sheet, graphite cloth, black sheet, polymer sheet, battery separator, double layer of polymer sheet, graphite cloth, polypropylene sheet. Over the length of the strips the composite was welded together in such a way that the welds are 5 cm apart and on both sides graphite cloth and separator protrude by approximately 1 cm. This composite, in whatever length desired, was stored away. When a battery has to be made, the composite is cut into the desired length and soaked in electrolyte solution. After the desired quantity of liquid has been taken up, the strip is sealed off at the two ends in a direction perpendicular to the length of the strip and the battery is ready. By connecting the respective ends of the graphite cloth with a suitable voltage or current source, the battery can be charged and discharged.

a. When the electrolyte solution is 3M potassium or ammonium chloride an 3M zinc bromide, charge occurs at an average voltage of 1.85 V and discharge at an average voltage 1.75 V at a current density of 3 mA per $cm^2$. Voltage efficiency is 94.5% and current efficiency 85% over two hour cycles. Charge/discharge behavior remains unchanged over the 50 cycles tried.

b. When the electrolyte solution is 3M KCl and 3M zinc chloride, charge occurs at an average voltage of 2.25 V and discharge at an average voltage of 1.8 V at a current density of 3 mA per $cm^2$. Voltage efficiency is 80% and current efficiency 79%. No changes in the current voltage behavior occurred during the fifty cycles of two hour duration each. This example shows the great advantage of preparing the ribbons in their dry state, in which state they are indefinitely storable, and wetting them only when a storage cell is required.

EXAMPLE 8

PVC/graphite composite discs were prepared and glued onto two PVC rings of 3 mm thickness with an internal area of 30 $cm^2$. One of the rings was filled with 50 mg of Ketjen black per $cm^2$ and both of them were filled with 30 mg of polyacrylamide foil per $cm^2$. Both rings were wetted with 9 ml of a 3/3M potassium chloride/zinc bromide solution. A non-woven polypropylene cloth was wetted and used as the separator between the two rings, which were clamped together. This battery of 6 mm thickness was charged and discharged at 6 mA per $cm^2$ and showed great stability over more than a hundred cycles. Total energy efficiency is 69% with an energy content of 36 wH/$cm^2$. This example shows that a thicker sample of large electrode area at higher current densities also shows a good behavior even without an ion specific separator.

EXAMPLE 9

Acrylamide was polymerized in the standard manner with N,N'-methylenediacrylamide as a crosslinking agent, and persulfate as the initiator. The polymerization was performed between two glass plates, which were held apart at the required distance. When polymerization was complete, the sheet thus obtained was washed with water and retained between polyethylene sheets until used. A PVC ring of eight mm thickness and an internal cross section of 10 $cm^2$ was filled with a mixture of 1.5 grams of high surface area carbon and 200 mg anion exchange beads, thoroughly wetted with a 3M $ZnBr_2$, 3M KCl solution. Another ring of 2 mm thickness was filled with 300 mg of low surface area carbon, and also thoroughly wetted with the same solution. The polyacrylamide sheet as obtained above (which had a thickness of 1 mm) was cut to approximately the desired size and immersed in the above electrolyte solution for half an hour. After that, the sheet was cut exactly to the size of the internal area of the PVC rings, and placed between them. This sandwich was then clamped between two current carriers. If charge/discharge cycles are initiated with the cell thus obtained, some solution may leak out, which will stop after a few cycles.

The cell produced in this example, at 6 hour cycles of 150 mA, givers a 90% voltage efficiency, 90% current efficiency, and an energy density of 120 mWh per ml. Over a one ohm load, the cell sustains 750 mA at a voltage of 1.1 volts. This conforms to a power density of 82.5 mW per ml, which may be increased at will by making the cell thinner without sacrificing the high energy density obtained in the thicker cell. This cell can be cycled for hundreds of cycle without change in its charge/discharge characteristics.

These examples demonstrate that, by using the laminate structure of the present invention wherein electrolyte is carried by a membrane, it is possible to construct zinc/halide rechargeable cells of an entirely new design. They lend themselves excellently to automated mass production. They can be used as very small units, but also can be rolled or stacked into very large units, which may be of interest for applications like electrical cars or peak requirements at power stations. They are well suited for storing electrical energy produced by photovoltaic cells, where they may be put on the back of the cells themselves or used as high energy density bigger separate storage units.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What is claimed is:

1. A rechargeable zinc halide electrolyte electrochemical cell comprising a laminate of the sequence:
    a. an electrically conducting chemically inert material;
    b. a membrane matrix formed of an hydrophilic polymer matrix in which is immobilized a zinc halide electrolyte; and c. an electrically conducting layer adapted to absorb and absorb halogen.

2. A laminate according to claim 1, which can be cut to any desired size of battery, where wires are attached to the final size assembly to layers (a) and (c).

3. An electrochemical cell according to claim 1, wherein layer (a) is a chemically inert-metal screen.

4. An electrochemical cell according to claim 1 wherein the sublayers attached with each other result in a multi-layer laminate of about 1 to 3 mm thickness.

5. A cell according to claim 1, wherein sublayer "a" is a product of an electronically conducting material, dissolved or dispersed in a suitable solvent.

6. A cell according to claim 1, wherein sublayer "b" comprises a polymer which is swellable in electrolyte solution.

7. A cell according to claim 1, wherein sublayer "b" comprises polyacrylamide.

8. A cell according to claim 1, wherein sublayer "b" comprises polyvinyl alcohol.

9. A cell according to claim 1, wherein sublayer "c" comprises activated carbon powder.

10. A cell according to claim 1, wherein sublayer "c" comprises a material having a specific electrical resistance of from 0.001 to one thousand ohm cm.

11. A cell according to claim 1, wherein sublayer "c" comprises a mixture of activated carbon powder having a specific electrical resistance of from 0.001 to 1000 ohm/cm with material containing anion exchange groups, selected from the group consisting of quaternary ammonium, quaternary phosphonium, tertiary sulfonium and polyamino groups.

12. A cell according to claim 1, wherein the electrolyte is a mixture of zinc bromide with halides of alkali metal ions, selected from the group consisting of Cs, K, Na, Li, and $NH_4$, and mixtures thereof.

13. A cell according to claim 1, wherein the electrolyte is a mixture of zinc chloride with halides of alkali metal ions, selected from the group consisting of Cs, K, Na, Li, and $NH_4$, and mixtures thereof.

14. A cell according to claim 1, serving as a unit cell in a secondary battery, the thickness of the cell being in the range of 2 microns to 5 centimeters.

15. A unit cell as defined in claim 14, wherein sublayer "a" is covered with an insulating layer, which is impermeable to electrolyte.

16. A cell according to claim 1, which is spirally wound.

17. A cell according to claim 16, wherein electrical connections between the unit cells are in series.

18. A cell according to claim 16, wherein electrical connections between the unit cells are in parallel.

19. A cell according to claim 1, stacked in a plate and frame mode.

20. A cell according to claim 1, prepared without electrolyte, the electrolyte being introduced at a later stage by bringing the composite into contact with an electrolyte solution.

21. The cell according to claim 20, wherein the electrolyte solution is a solution containing a mixture of a zinc salt selected from the group consisting of zinc chloride and zinc bromide with halides of alkali metal ions selected from the group consisting of Cs, K Na, Li, $NH_4$, and mixtures thereof.

22. An electrochemical cell according to claim 1 wherein layer "a" is made of a paper-like material.

23. An electrochemical cell according to claim 1 wherein layer "a" is activated carbon; layer "b" is a crosslinked polymer gel supporting a zinc halide; and layer "c" is activated carbon.

24. A rechargeable zinc halide electrolyte electrochemical cell comprising a laminate of the sequence:
a. an electrically conducting chemically inert material;
b. a membrane matrix formed of an hydrophilic polymer matrix in which is immobilized a zinc halide electrolyte; and
c. an electrically conducting layer adapted to absorb and adsorb halogen;
further comprising at least one additional matrix supporting zinc halide or separator.

25. A cell according to claim 24, wherein sublayer "b" is made of a material selected from the group consisting of polyvinyl alcohol and polyacrylamide.

26. A rechargeable zinc halide electrolyte electrochemical cell comprising a laminate of the sequence:
a. an electrically conducting chemically inert material;
b. a membrane matrix formed of an hydrophilic polymer matrix in which is immobilized a zinc halide electrolyte; and
c. an electrically conducting layer adapted to absorb and adsorb halogen;
further including a fourth sublayer which comprises a porous membrane matrix.

* * * * *